United States Patent
Li et al.

(10) Patent No.: US 11,887,009 B2
(45) Date of Patent: Jan. 30, 2024

(54) AUTONOMOUS DRIVING CONTROL METHOD, APPARATUS AND DEVICE, AND READABLE STORAGE MEDIUM

(71) Applicant: INSPUR SUZHOU INTELLIGENT TECHNOLOGY CO., LTD., Jiangsu (CN)

(72) Inventors: Rengang Li, Shandong (CN); Yaqian Zhao, Shandong (CN); Ruyang Li, Shandong (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/039,271

(22) PCT Filed: Sep. 29, 2021

(86) PCT No.: PCT/CN2021/121903
§ 371 (c)(1),
(2) Date: May 29, 2023

(87) PCT Pub. No.: WO2022/252457
PCT Pub. Date: Dec. 8, 2022

(65) Prior Publication Data
US 2023/0351200 A1 Nov. 2, 2023

(30) Foreign Application Priority Data
Jun. 1, 2021 (CN) .......................... 202110606769.8

(51) Int. Cl.
*G06N 3/092* (2023.01)
*B60W 60/00* (2020.01)
(52) U.S. Cl.
CPC ......... *G06N 3/092* (2023.01); *B60W 60/0015* (2020.02); *B60W 2554/00* (2020.02)

(58) Field of Classification Search
None
See application file for complete search history.

(56) References Cited

U.S. PATENT DOCUMENTS

2018/0009445 A1  1/2018  Nishi
2019/0362238 A1* 11/2019  Pietquin ................. G06N 3/006
(Continued)

FOREIGN PATENT DOCUMENTS

CN  109492763 A  3/2019
CN  109657800 A  4/2019
(Continued)

OTHER PUBLICATIONS

Ruckstieb et al., "State-Dependent Exploration for Policy Gradient Methods", Technische Universitat, Munchen, Germany, 2008, pp. 234-249 (Year: 2008).*
(Continued)

*Primary Examiner* — Tamara L Weber
(74) *Attorney, Agent, or Firm* — IPro, PLLC (57) ABSTRACT

The present application discloses an automatic driving control method. In the method, parameters are optimally set by using a noisy and noiseless dual-strategy network, identical vehicle traffic environment state information is input into the noisy and noiseless dual-strategy network, a motion space perturbation threshold is set by using a noiseless strategy network as a comparison and a benchmark so as to adaptively adjust noise parameters, and motion noise is indirectly added by adaptively injecting noise into a strategy network parameter space, such that exploration of an environment and a motion space by a deep reinforcement learning algorithm may be effectively improved, automatic driving exploration performance and stability based on deep reinforcement learning is improved, and full consideration of influence of an environment state and driving strategies in vehicle decision-making and motion selection is ensured,
(Continued)

thereby improving the stability and safety of an automatic vehicle.

14 Claims, 2 Drawing Sheets

(56) References Cited

U.S. PATENT DOCUMENTS

| | | | |
|---|---|---|---|
| 2020/0033869 A1 | 1/2020 | Palanisamy et al. | |
| 2020/0175364 A1* | 6/2020 | Xu | G06N 3/045 |
| 2020/0394541 A1* | 12/2020 | Hazard | G06N 20/00 |
| 2021/0070325 A1* | 3/2021 | Isele | B60W 60/00274 |
| 2021/0397961 A1* | 12/2021 | Choi | G06N 3/08 |
| 2022/0261630 A1* | 8/2022 | Fulton | G06N 7/01 |
| 2022/0309383 A1* | 9/2022 | Sautier | G06F 18/2148 |

FOREIGN PATENT DOCUMENTS

| | | |
|---|---|---|
| CN | 110322017 A | 10/2019 |
| CN | 110447041 A | 11/2019 |
| CN | 111845741 A | 10/2020 |
| CN | 111966118 A | 11/2020 |
| CN | 112099496 A | 12/2020 |
| CN | 112249032 A | 1/2021 |
| CN | 112255931 A | 1/2021 |
| CN | 112462792 A | 3/2021 |
| CN | 112580148 A | 3/2021 |
| CN | 113253612 A | 8/2021 |

OTHER PUBLICATIONS

Kuutti et al., "A Survey of Deep Learning Applications to Autonomous Vehicle Control", IEEE Transactions on Intelligent Transportation Systems, vol. 22, No. 2, Feb. 2021, pp. 712-733 (Year: 2021).*

Plappert, Matthias, et al. "Parameter space noise for exploration." arXiv preprint arXiv:1706.01905 (2017).

Thrun, Sebastian, and Anton Schwartz. "Finding structure in reinforcement learning." Advances in neural information processing systems 7 (1994).

Zhang Bin, He Ming, Chen Xiliang, et al. "Self-driving via improved DDPG algorithm." Computer Engineering and Applications, 2019, 55(10): 264-270.

Gupta, Abhishek, et al. "Meta-reinforcement learning of structured exploration strategies." 32nd Conference on Neural Information Processing Systems (NeurIPS 2018), Montr al, Canada (2018).

Zhihang Li. "Autonomous Driving Strategy Based on Deep Recursive Reinforcement Learning." Industrial control computer, 2020, 33(4).

Fortunato, Meire, et al. "Noisy networks for exploration." arXiv preprint arXiv:1706.10295 (2017).

Jiahao Sun, et al. "Research on Unmanned Driving Simulation Based on Reinforcement Learning." Agricultural Equipment and Vehicle Engineering. Jun. 2020, 58(6).

Li, R. Y., et al. "Overview on Algorithms and Applications for Reinforcement Learning." Computer Systems and Applications 29.12 (2020): 13-25.

Wan, Lipeng, et al. "A review of deep reinforcement learning theory and application." Pattern Recognition and Artificial Intelligence 32.1 (2019): 67-81.

* cited by examiner

AUTONOMOUS DRIVING CONTROL METHOD, APPARATUS AND DEVICE, AND READABLE STORAGE MEDIUM

CROSS-REFERENCE TO RELATED APPLICATION

This application claims the priority of the Chinese Patent application filed on Jun. 1, 2021 before the China National Intellectual Property Administration with the application number of 202110606769.8, and the title of "AUTOMATIC DRIVING CONTROL METHOD, APPARATUS AND DEVICE, AND READABLE STORAGE MEDIUM", which is incorporated herein in its entirety by reference.

FIELD

The present disclosure relates to the technical field of automatic driving and, more particularly, to a method, an apparatus, a device for automatic driving control and a readable storage medium.

BACKGROUND

In modern city traffic, with increasing number of motor vehicles, road congestion becomes serious and traffic accidents occur frequently. As a most potential way to improve traffic conditions and improve safety and convenience of travel, assisted driving/automatic driving have gained increasing attention. Automatic driving is a very complex integrated technology, which involves hardware apparatus such as onboard sensors, data processors and controllers. With aid of modern mobile communication and network technology, information transmission and sharing among traffic participants may be realized, and functions such as environmental awareness, decision-making planning and control execution may be realized through complex algorithms, to realize operations such as automatic acceleration/deceleration, steering, overtaking and braking of vehicles.

Existing research and application methods of automatic driving may be mainly divided into two types, namely a modular method and an end-to-end method. A reinforcement learning method in the end-to-end method is configured to explore and improve automatic driving strategies from beginning with aid of a Markov decision process (MDP). With rapid development of advanced machine learning methods represented by reinforcement learning and inherent potential of surpassing human drivers, research and application of automatic driving based on the reinforcement learning has broad development prospects.

At present, in an automatic driving sequential decision process based on deep reinforcement learning, an action is selected in a vehicle by using a driving strategy represented by a neural network according to a current traffic environmental state. In order to facilitate full exploration of an action space in an automatic driving vehicle, it is required to add an exploration noise to a selected action in each of the decision-making processes to increase exploration of automatic driving strategies. The exploration noise generally is in a form of Gaussian distribution sampling. Due to randomness of the exploration noise, this kind of random noise is not correlated with an environmental state and a driving strategy, which results in uncontrollability of a size of the added noise, and different decisions may be made in the automatic driving vehicle when a same traffic condition is faced. When there is a problem with a final decision, it is impossible to determine whether there is a problem with the neural network or with disturbance, which results in more unpredictable exploration and is easy to bring security risks to automatic driving.

SUMMARY

An object of the present disclosure is to provide a method, an apparatus, a device for automatic driving control and a readable storage medium, which may improve stability and safety of an automatic driving vehicle.

In order to solve above technical problems, following technical solutions are provided in the present disclosure.

A method for automatic driving control includes:
initializing a system parameter of a deep-reinforcement-learning automatic driving decision system, wherein the deep-reinforcement-learning automatic driving decision system includes a noiseless strategic network and a noisy strategic network;
obtaining vehicle traffic environmental state information;
inputting the vehicle traffic environmental state information into the noiseless strategic network and the noisy strategic network to perform automatic driving strategy generation to obtain a noiseless strategy and a noisy strategy;
adjusting a noise parameter injected into the noisy strategic network within a disturbance threshold according to the noisy strategy and the noiseless strategy;
performing parameter optimization on a system parameter of the noisy strategic network according to the noise parameter to generate an optimized noisy strategic network; and
performing automatic driving control according to a driving strategy generated by the optimized noisy strategy network.

In some embodiments, adjusting the noise parameter injected into the noisy strategic network within the disturbance threshold according to the noisy strategy and the noiseless strategy includes:
calculating strategy difference between the noisy strategy and the noiseless strategy;
determining whether the strategy difference exceeds a disturbance threshold;
taking a quotient of the strategy difference and a modulation factor as the noise parameter when the strategy difference exceeds the disturbance threshold; and
taking a product of the strategy difference and the modulation factor as the noise parameter when the strategy difference does not exceed the disturbance threshold; wherein the modulation factor is greater than 1.

In some embodiments, performing parameter optimization on the system parameter of the noisy strategic network according to the noise parameter includes:
performing parameter optimization on a system parameter of the noiseless strategic network according to the noisy strategy, and taking a system parameter of the optimized noiseless strategic network as an original parameter;
taking a sum of the original parameter and the noise parameter as an optimized system parameter of the noisy strategic network.

In some embodiments, before performing the automatic driving control according to the driving strategy generated by the optimized noisy strategy network, the method further includes:
determining execution times of the parameter optimization;

determining whether the execution times reach a threshold number of training times;

performing the step of performing the automatic driving control according to the driving strategy generated by the optimized noisy strategy network, when the execution times reach the threshold number of training times; and performing the step of obtaining the vehicle traffic environmental state information when the execution times do not reach the threshold number of training times.

In some embodiments, the method for automatic driving control further includes:

performing the step of initializing the system parameter of the deep-reinforcement-learning automatic driving decision system when a notice of driving accident is received.

An apparatus for automatic driving control, including:

a parameter initialization unit configured to initialize a system parameter of a deep-reinforcement-learning automatic driving decision system, wherein the deep-reinforcement-learning automatic driving decision system includes a noiseless strategic network and a noisy strategic network;

an environment obtaining unit configured to obtain vehicle traffic environmental state information;

a strategy generating unit configured to input the vehicle traffic environmental state information into the noiseless strategic network and the noisy strategic network to perform automatic driving strategy generation to obtain a noiseless strategy and a noisy strategy;

a noise adjusting unit configured to adjust a noise parameter injected into the noisy strategic network within a disturbance threshold according to the noisy strategy and the noiseless strategy;

a parameter optimization unit configured to perform parameter optimization on a system parameter of the noisy strategic network according to the noise parameter to generate an optimized noisy strategic network; and a driving control unit configured to perform automatic driving control according to a driving strategy generated by the optimized noisy strategy network.

In some embodiments, the noise adjustment unit includes:

a difference calculation subunit configured to calculate strategy difference between the noisy strategy and the noiseless strategy;

a difference determining subunit configured to determine whether the strategy difference exceeds a disturbance threshold, trigger a first processing subunit when the strategy difference exceeds the disturbance threshold, and trigger a second processing subunit when the strategy difference does not exceed the disturbance threshold;

the first processing subunit configured to take a quotient of the strategy difference and a modulation factor as the noise parameter; and the second processing subunit configured to take a product of the strategy difference and the modulation factor as the noise parameter; wherein the modulation factor is greater than 1;

In some embodiments, the parameter optimization unit includes:

a parameter determining subunit configured to perform parameter optimization on a system parameter of the noiseless strategic network according to the noisy strategy, and to take a system parameter of the optimized noiseless strategic network as an original parameter; and a sum optimization subunit configured to take a sum of the original parameter and the noise parameter as an optimized system parameter of the noisy strategic network.

A device for automatic driving control, including:

a memory configured for storing a computer program; and a processor configured for implementing steps of the method for automatic driving control stated above when the computer program is executed.

A readable storage medium, having a computer program stored thereon and the computer program, when executed by a processor, implementing steps of the method for automatic driving control stated above.

In the method according to the embodiment of the present disclosure, a noisy and noiseless dual-strategic network is adopted to optimize parameter setting, the same vehicle traffic environmental state information is input to the noisy and noiseless dual-strategic network, an action space disturbance threshold is set by taking the noiseless strategic network as comparison and benchmark, to adaptively adjust the noise parameter, and action noise may be indirectly added by adaptively injecting noise into a parameter space of the strategic network, which may effectively improve exploration to the environment and action space by the deep reinforcement learning algorithm, improve performance and stability of automatic driving exploration based on deep reinforcement learning, ensure that influence of the environmental state and the driving strategy is fully considered in vehicle decision-making and action selection, and further improve stability and safety of the automatic driving vehicle.

Correspondingly, an apparatus and a device for automatic driving control and a readable storage medium corresponding to the method for automatic driving control described above are further provided in embodiments of the present disclosure, which have technical effects described above and are not described repeatedly here again.

BRIEF DESCRIPTION OF THE DRAWINGS

In order to more clearly explain the technical solution in the embodiment or the existing technology of the present disclosure, the following may briefly introduce the drawings that need to be used in the embodiment or the existing technology description. Obviously, the drawings in the following description are only the embodiment of the present disclosure. For a person skilled in the art, other drawings may be obtained according to the provided drawings without paying creative labor.

DETAILED DESCRIPTION

A core of the present disclosure is to provide a method for automatic driving control, which may improve stability and safety of an automatic driving vehicle.

In order to make a person skilled in the art better understand the solution of the present application, the following is a further detailed description of the present application in combination with the drawing and the embodiments. Obviously, the described embodiments are only a part of the embodiments of the present application, not all of the embodiments. Based on the embodiments of the present application, all other embodiments obtained by a person skilled in the art without making creative labor belong to the scope of protection in the present application.

At present, an automatic driving sequential decision process based on deep reinforcement learning is as follows: actions such as acceleration/deceleration, steering, lane change, braking, etc. are selected by using the driving strategy represented by a neural network according to current traffic environment state in the automatic driving vehicle, and a reward is obtained. A driving strategy is adjusted according to the obtained rewards for the automatic driving vehicle, and a next decision-making process is proceeded in combination with new traffic conditions. A sequential decision is made through interaction of the automatic driving vehicle with the environment, and an optimal driving strategy is learnt to achieve safe driving.

In order to facilitate full exploration to an action space in an automatic driving vehicle, an exploration noise, which is generally in a form of Gaussian distribution sampling, is added to a selected action in each of the decision-making processes in main methods currently adopted in related art. For example, when action instruction for speeding up to 50 km/h is generated by the strategic network, then a random value, such as 10, is selected from a Gaussian distribution, and an action instruction for speeding up to 60 km/h (50+10) is finally generated. A method of adding the exploration noise is very simple. However, this kind of random noise is not correlated with an environmental state and a driving strategy, and different decisions may be made in the automatic driving vehicle when a same traffic condition is faced, which results in more unpredictable exploration and brings security risks.

Figure 1:
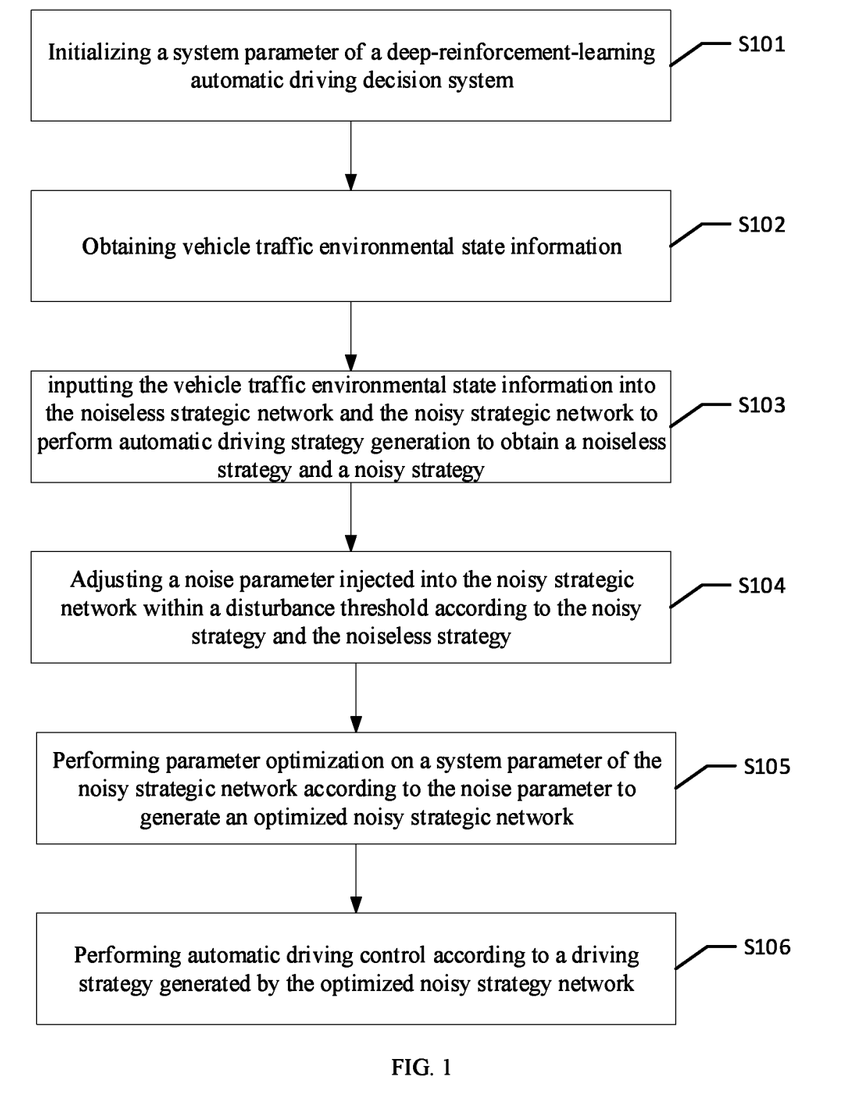
FIG. 1 is an implementation flowchart implementing a method for automatic driving control according to an embodiment of the present disclosure.

In order to avoid instability and unsafe factors brought by the added exploration noise to the automatic driving control, the method for automatic driving control is proposed in the present embodiment. Referring to FIG. 1, which is a flow chart of a method for automatic driving control in the embodiment of the present disclosure, the method includes following steps S101 to S106.

In step S101, a system parameter of a deep-reinforcement-learning automatic driving decision system is initialized.

The deep-reinforcement-learning automatic driving decision system is a system for generating automatic driving strategy information constructed in the present embodiment. The deep-reinforcement-learning automatic driving decision system includes two strategic networks, namely a noiseless strategic network and a noisy strategic network. The noiseless strategic network refers to a strategic network with no noise (No_Noise_Net), and the noisy strategic network refers to a strategic network (Noise Net) with implicit noise. The strategic network is a network constructed based on a deep-reinforcement-learning strategy parameter space. A deep learning algorithm specified in the deep-reinforcement-learning automatic driving decision system is not limited in the present embodiment, and considering continuity of a state space and action space of the automatic driving problem, deep reinforcement learning algorithms such as DDPG, A3C, SAC, TD3 are available for selection. In the present embodiment, a simple DDPG algorithm is mainly taken as an example for illustration, and application of other deep reinforcement learning algorithms may be referred to introduction of the present embodiment, which is not repeatedly described herein again. Accordingly, the system parameter involved in a step in which the system parameter of the deep-reinforcement-learning automatic driving decision system is initialized mainly include four parameters, namely $\theta_0$ (an initial strategy parameter with no noise), $\theta'_0$ (an initial strategy parameter with implicit noise), $\omega_0$ (an initial network parameter) and initial strategy parameter noise $\sigma_0$.

In addition to the strategic network, the deep-reinforcement-learning automatic driving decision system also includes an evaluation network (Critical_Net). It should be noted that network structures of the noiseless strategic network, the noisy strategic network and the evaluation network are not limited in the present embodiment, and construction of corresponding network structures may be referred to related art, which is not repeatedly described herein again.

In step S102, vehicle traffic environmental state information is obtained.

The vehicle traffic environmental state information refers to traffic environmental state information around the vehicle to be subjected to automatic driving control. A collection process of the vehicle traffic environmental state information and information items included in the vehicle traffic environmental state information (as long as automatic driving control may be realized based on this) are not limited in the present embodiment. For example, an onboard sensor device such as a camera, a global positioning system, an inertial measurement unit, a millimeter-wave radar and a laser radar may be used to obtain driving environmental state (such as weather data, traffic lights, traffic topology information), information such as positions and operation states of the automatic driving vehicle and other traffic participants, direct original image data obtained by the camera, and a depth map and a semantic segmentation map obtained by processing by a deep learning model (such as RefineNet). These driving environment state, vehicle information for current automatic driving, positions of other traffic participants, operation states of other traffic participants and the semantic segmentation map are taken as the vehicle traffic environmental state information, and in the present embodiment, only introduction is made by taking above information forms and obtaining models as an example, and an obtaining model of other information may be referred to introduction of this embodiment, which is not repeatedly described herein again.

In step S103, the vehicle traffic environmental state information is input into the noiseless strategic network and the noisy strategic network to perform automatic driving strategy generation to obtain a noiseless strategy and a noisy strategy.

The vehicle traffic environmental state information is input into the noiseless strategic network and the noisy strategic network. A strategic network without noise (the noiseless strategic network) and a strategic network with implicit noise (the noisy strategic network) share a strategy function $\pi$, that is, the noiseless strategic network and the noisy strategic network share a set of automatic driving calculation methods, which may realize calculation in automatic driving independently.

For the input vehicle traffic environmental state information $S_t$, the noiseless strategic network is configured to perform automatic driving strategy generation based on a strategy parameter $\theta$ with no noise to obtain an action for the noiseless strategy at $a_t=\pi(a_t|s_t,\theta)$. The noisy strategic network is configured to perform automatic driving strategy generation based on a strategy parameter $\theta'$ with implicit noise to obtain an action for the noisy strategy at $a'_t=(a'_t|s_t,\theta')$ It should be noted that a process of calling the two networks to process the vehicle traffic environmental state information respectively may be referred to an information processing mode of a prior strategic network, which is not limited herein.

In step S104, a noise parameter injected into the noisy strategic network is adjusted within a disturbance threshold according to the noisy strategy and the noiseless strategy.

The noisy strategy and the noiseless strategy may indicate degree of impact of noise on an automatic driving decision. When difference between them is too large, it indicates that the added noise may be too large, which may cause great interference to normal decision-making, resulting in deviation from the noisy strategy. For example, when an original strategy indicates to accelerate to 50 km/h, and adding a large noise may cause the strategy to accelerate to 70 km/h, resulting in factors unfavorable to safe and stable driving, such as overspeed. In the present embodiment, in order to avoid influence of random noise on stability and correctness of the strategy, and at the same time to ensure exploratory nature of the strategy, the disturbance threshold is set, which is a range of added noise, and the noise may be limited in the disturbance threshold range, so that influence of excessive noise may be avoided. Meanwhile, a noise value may be adjusted according to the noisy strategy and the noiseless strategy, so that reverse feedback by the generated strategy for the added noise may be achieved, and a noise $o_{t+1}$ of a strategy parameter space for a next injection may be adaptively adjusted based on the set disturbance threshold.

However, noise value adjusting rules are not limited in the present embodiment, and may be set according to actual use needs. An implementation is as follows:

(1) Strategy difference between the noisy strategy and the noiseless strategy is calculated.

Strategic difference between actions at (the noiseless strategy) and a'$_t$ (the noisy strategy) of automatic driving vehicles with no noise and with implicit noise is calculated. An evaluation standard for the strategic difference is not limited in the present embodiment. For example, a distance may be used as the evaluation standard for the strategic difference, and accordingly, the strategy difference between the noisy strategy and the noiseless strategy, that is, a disturbance amplitude of the strategy parameter noise to the action, may be calculated $d=\|a_t-a'_t\|_2$.

In the present embodiment, only distance is taken as an example to introduce the evaluation standard for the strategy difference, and other evaluation criteria may be referred to introduction of this embodiment, which is not repeatedly described herein again.

(2) It is determined whether the strategy difference exceeds the disturbance threshold.

The disturbance threshold is a preset strategy difference threshold. In the present disclosure, strategic difference between the noisy strategic network and the noiseless strategy in actual strategy generation may be controlled not to exceed the disturbance threshold, to avoid excessive influence of the noise parameter on the strategy generation and influence on accuracy and stability in generating the strategy.

(3) When the strategy difference exceeds the disturbance threshold, a quotient of the distance and a modulation factor is taken as the noise parameter.

(4) When the strategy difference does not exceed the disturbance threshold, a product of the distance and the modulation factor is taken as the noise parameter. The modulation factor is greater than 1.

When the strategy difference exceeds the disturbance threshold, it indicates that current noise disturbance is too large and the noise parameter needs to be reduced. A noise parameter reducing strategy proposed in the present embodiment is to do the quotient. When the strategy difference does not exceed the disturbance threshold, in order to increase the exploratory nature of the deep learning while avoiding noise disturbance exceeding the disturbance threshold, the noise parameter may be increased, and a noise parameter increasing strategy proposed in the present embodiment is to do the product.

According to a relationship between the strategy difference d and the disturbance threshold δ, the parameter noise $o_{t+1}$ is adaptively updated, $$\sigma_{t+1} = \begin{cases} \alpha \sigma_t, \text{ for } d \leq \delta \\ \frac{1}{\alpha}\sigma_t, \text{ for } d > \delta \end{cases},$$

wherein the modulation factor α is greater than 1.

In the present embodiment, the above-described noise parameter adjusting method is only introduced as an example. In addition, other calculation methods may be adopted, such as that in which a certain value is subtracted when the disturbance threshold is exceeded, and a certain value is added when the disturbance threshold is not exceeded, etc., and other adjustment methods may be referred to introduction of this embodiment, which is not repeatedly described herein again.

In step S105, parameter optimization is performed on a system parameter of the noisy strategic network according to the noise parameter to generate an optimized noisy strategic network.

Based on the set disturbance threshold, after adaptively adjusting the noise parameter $\sigma_{t+1}$ injected in the strategy parameter space, the system parameter of the noisy strategic network is optimized according to the noise parameter. It is necessary to update a parameter ω of the evaluation network (Critical_Net), a parameter θ of the noiseless strategic network (No_Noise_Net) and a parameter θ' of the network with implicit noise (Noise Net).

After the noise parameter is determined, an implementation of updating the parameter co of the evaluation network (Critical_Net) and the parameter θ of the noiseless strategic network (No_Noise_Net) may be referred to implementations in the related art, which is not limited in the present embodiment. For deep understanding, an implementation is introduced here as follows:

(1) The evaluation network (Critic_Net) calculates a value function $Q(s_t,a'_t)$ based on an action $\alpha'_t$ with implicit noise, and gets a reward $r_t$ given by the environment. The loss function is minimized to update the network parameter ω. The loss function is defined as:

$$L = \frac{1}{N}\sum_t (r_t + \gamma Q'(s_{Dt+1}, a'_{Dt+1}) - Q(s_t, a'_t))^2$$

wherein N is a number of samples collected and γ is a discount factor, usually taken as a constant between 0 and 1. The value function represented by $Q'(s_{Dt+1}, a'_{Dt+1})$ is obtained by calculating the data in a replay buffer D. The replay buffer D is consisted of a series of historical data $c_{Dt}=(s_{Dt},a'_{Dt},r_{Dt},s_{Dt+1})$ obtained by pre-training, contained are noisy actions.

The parameter θ of the noiseless strategic network (No_Noise_Net) is updated through the following strategy gradient:

$$\nabla_\theta J(\theta) = \frac{1}{N} \sum_t [\nabla_{a'} Q(s_t, a'_t) \nabla_\theta \pi(a_t | s_t)]$$

wherein J(θ) is an objective function of a strategy gradient method, usually expressed as a function in terms of reward $r_t$. The objective function $\nabla_\theta J(\theta)$ is maximized to get the strategy gradient, and the parameter θ of the noiseless strategic network (No_Noise_Net) is updated by using $\theta \leftarrow \theta + \kappa \nabla_\theta J(\theta)$, wherein K is a fixed time step parameter.

As for a parameter optimization method of the parameter κ' of the noisy strategic network (Noise Net), an optimization method is provided in the present embodiment, which may be as follows: the adaptive noise parameter $\theta_{t+1}$ obtained in the above steps is combined with the optimized parameter θ of the noiseless strategic network (No_Noise_Net), and let $\theta' = \theta + \sigma_{t+1}$, namely the system parameter and noise parameter of the optimized noiseless strategic network are summed as an optimized system parameter θ' of the noisy strategic network. This updating method may ensure accuracy of parameter orientating of the noisy strategic network. In the present embodiment, the above-described updating mode of the system parameter of the noisy strategic network is only introduced as an example, and other implementations may be referred to introduction of this embodiment, which is not repeatedly described herein again.

In step S106, automatic driving control is performed according to a driving strategy generated by the optimized noisy strategy network.

After parameter optimization is performed on the noisy strategic network, the automatic driving control may be performed according to the optimized noisy strategic network. The real-time collected vehicle traffic environmental state information is transmitted to the optimized noisy strategic network, and the driving strategy output by the optimized noisy strategic network is used as the driving strategy to be executed for the automatic driving control. The implementation of the automatic driving control according to the determined driving strategy to be executed may be referred to introduction of the related art, which is not repeatedly described herein again.

Furthermore, in the above steps, implementing steps of one-time system parameter optimization are introduced. In order to enhance accuracy of automatic driving decision, the final noisy strategic network may be used as a network to be called to perform automatic driving control.

Accordingly, in order to improve optimization effect, before the automatic driving control is performed according to the driving strategy generated by the optimized noisy strategic network, following steps may be further performed.

(1) Execution times of the parameter optimization is determined;
(2) it is determined whether the execution times reach a threshold number of training times;
(3) when the execution times reach the threshold number of training times, a step in which the automatic driving control is performed according to the driving strategy generated by the optimized noisy strategy network is performed.

(4) when the execution times do not reach the threshold number of training times, a step of obtaining the vehicle traffic environmental state information is performed.

The above shows an exit mode of parameter optimization, that is, when the execution times of parameter optimization reach a preset threshold number of training times (for example, 10000 times), a step of parameter optimization exits, the currently generated system parameter is taken as the optimized parameter, and the current deep-reinforcement-learning automatic driving decision system is taken as the optimized network, and a step of the automatic driving control is performed according to the optimized network. When the preset threshold number of training times is not reached, the system parameter generated in a last parameter optimization training process is continuously added with new vehicle traffic environmental state information for parameter optimization training, and steps after step S102 are executed.

However, in some cases, there may be some deviations in a process of parameter optimization that threaten safety of automatic driving. In order to ensure the safety of automatic driving, when a notice of driving accident is received, the current step of parameter optimization may exit to perform a step of initializing the system parameter of the deep-reinforcement-learning automatic driving decision system, and to perform optimization training on the system parameter on a basis of the reinitialized system parameter. The driving accident may be for example collision of the current vehicle, rushing out of a lane, etc., which is not limited herein.

Based on above introduction, in the technical solutions according to the embodiment of the present disclosure, a noisy and noiseless dual-strategic network is adopted to optimize parameter setting, the same vehicle traffic environmental state information is input to the noisy and noiseless dual-strategic network, an action space disturbance threshold is set by taking the noiseless strategic network as comparison and benchmark, to adaptively adjust the noise parameter, and action noise may be indirectly added by adaptively injecting noise into a parameter space of the strategic network, which may effectively improve exploration to the environment and action space by the deep reinforcement learning algorithm, improve performance and stability of automatic driving exploration based on deep reinforcement learning, ensure that influence of the environmental state and the driving strategy is fully considered in vehicle decision-making and action selection, and further improve stability and safety of the automatic driving vehicle.

Corresponding to the above method embodiment, an apparatus for automatic driving control is further provided in the embodiment of the present disclosure, and the apparatus for automatic driving control described below and the method for automatic driving control described above may be referred to each other correspondingly.

Figure 2:
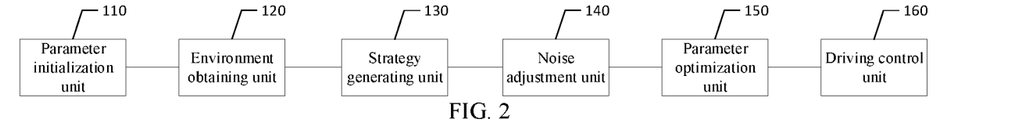
FIG. 2 is a schematic structural diagram of an apparatus for automatic driving control according to an embodiment of the present disclosure.

Referring to FIG. 2, the apparatus includes following modules: a parameter initialization unit 110, an environment obtaining unit 120, a strategy generating unit 130, a noise adjustment unit 140, a parameter optimization unit 150 and a driving control unit 160.

The parameter initialization unit 110 is mainly configured to initialize a system parameter of a deep-reinforcement-learning automatic driving decision system. The deep-reinforcement-learning automatic driving decision system includes a noiseless strategic network and a noisy strategic network.

The environment obtaining unit 120 is mainly configured to obtain vehicle traffic environmental state information.

The strategy generating unit 130 is mainly configured to input the vehicle traffic environmental state information into the noiseless strategic network and the noisy strategic network to perform automatic driving strategy generation to obtain a noiseless strategy and a noisy strategy.

The noise adjustment unit 140 is mainly configured to adjust a noise parameter injected into the noisy strategic network within a disturbance threshold range according to the noisy strategy and the noiseless strategy.

The parameter optimization unit 150 is mainly configured to perform parameter optimization on a system parameter of the noisy strategic network according to the noise parameter to generate an optimized noisy strategic network.

The driving control unit 160 is mainly configured to perform automatic driving control according to a driving strategy generated by the optimized noisy strategy network.

In an implementation of the present disclosure, the noise adjustment unit includes a difference calculation subunit, a difference determining subunit.

The difference calculation subunit is configured to calculate strategy difference between the noisy strategy and the noiseless strategy.

The difference determining subunit is configured to determine whether the strategy difference exceeds a disturbance threshold. When the strategy difference exceeds the disturbance threshold, the first processing subunit is triggered. When the strategy difference does not exceed the disturbance threshold, the second processing subunit is triggered.

The first processing subunit is configured to take a quotient of the strategy difference and a modulation factor as the noise parameter.

The second processing subunit is configured to take a product of the strategy difference and the modulation factor as the noise parameter. The modulation factor is greater than 1.

In an implementation of the present disclosure, the parameter optimization unit includes a parameter determining subunit and a sum optimization subunit.

The parameter determining subunit is configured to perform parameter optimization on a system parameter of the noiseless strategic network according to the noisy strategy, and to take a system parameter of the optimized noiseless strategic network as an original parameter.

The sum optimization subunit is configured to take a sum of the original parameter and the noise parameter as an optimized system parameter of the noisy strategic network.

Corresponding to the above method embodiment, a device for automatic driving control is further provided in the embodiment of the present disclosure, and the device for automatic driving control described below and the method for automatic driving control described above may be referred to each other correspondingly.

The device for automatic driving control includes:
a memory configured for storing a computer program; and
a processor configured to implement steps of the method for automatic driving control of the above method embodiment when executing the computer program.

Figure 3:
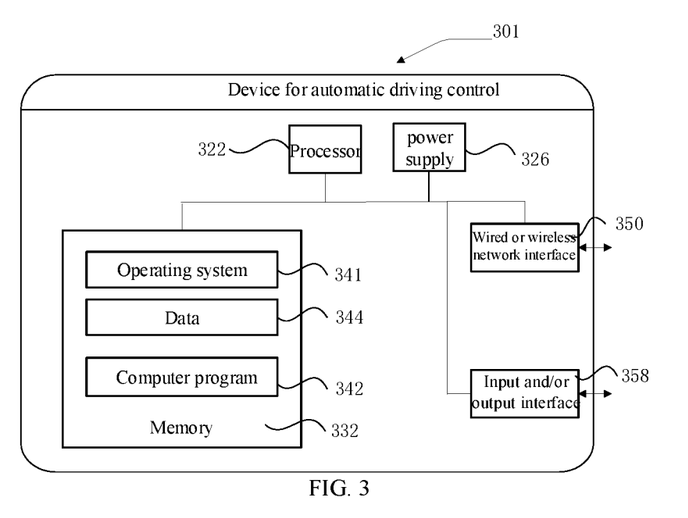
FIG. 3 is a schematic structural diagram of a device for automatic driving control according to an embodiment of the present disclosure.

Referring to FIG. 3, which is a schematic structural diagram of a device for automatic driving control provided in the present embodiment. The device for automatic driving control may largely vary due to different configurations or performances thereof, and may include one or more central processing units (CPU) 322 (for example, one or more processors) and a memory 332, and the memory 332 is configured to store one or more computer applications 342 or data 344. The memory 332 may be transitory storage or persistent storage. The program stored in the memory 332 may include one or more modules (not shown), and each module may include a series of instruction operations on a data processing device. Furthermore, the central processor 322 may be arranged to be communicated with the memory 332 and to execute a series of instruction operations in the memory 332 on the device for automatic driving control 301.

The device for automatic driving control 301 may also include one or more power supplies 326, one or more wired or wireless network interfaces 350, one or more input and/or output interfaces 358, and/or one or more operating systems 341.

Steps in the method for automatic driving control described above may be realized with a structure of the device for automatic driving control.

Corresponding to the above method embodiment, a readable storage medium is further provided in the embodiment of the present disclosure, and the readable storage medium described below and the method for automatic driving control described above may be referred to each other correspondingly.

The readable storage medium has computer program stored thereon, and the computer program, when executed by a processor, implements steps of the method for automatic driving control in the above method embodiment.

The readable storage medium may be a USB flash drive, a removable hard drive, a read-only memory (ROM), a random access memory (RAM), a magnetic disk, an optical disk and other readable storage media that may store program codes.

It may be further realized by those skilled in the art that units and algorithm steps of respective examples described in connection with embodiments disclosed herein may be realized in electronic hardware, computer software or a combination of the both. In order to clearly illustrate interchangeability of hardware and software, components and steps of respective examples have been generally described by functions in the above description. Whether these functions are implemented in hardware or software depends on application and design constraints of technical solutions. Described functions may be implemented for each application using different methods by those skilled in the art, but such implementation should not be considered beyond scope of the present disclosure.

The invention claimed is:

1. A method for automatic driving control, comprising:
initializing a system parameter of a deep-reinforcement-learning automatic driving decision system, wherein the deep-reinforcement-learning automatic driving decision system comprises a noiseless strategic network and a noisy strategic network;
obtaining vehicle traffic environmental state information;
inputting the vehicle traffic environmental state information into the noiseless strategic network and the noisy strategic network to perform automatic driving strategy generation, to obtain a noiseless strategy and a noisy strategy;
adjusting a noise parameter injected into the noisy strategic network within a disturbance threshold according to the noisy strategy and the noiseless strategy, wherein adjusting the noise parameter injected into the noisy strategic network within the disturbance threshold according to the noisy strategy and the noiseless strategy comprises: calculating strategy difference between the noisy strategy and the noiseless strategy; determining whether the strategy difference exceeds a disturbance threshold; taking a quotient of the strategy difference and a modulation factor as the noise parameter when the strategy difference exceeds the disturbance threshold; and taking a product of the strategy difference and the modulation factor as the noise parameter when the strategy difference does not exceed the disturbance threshold; wherein the modulation factor is greater than 1;

performing parameter optimization on a system parameter of the noisy strategic network according to the noise parameter to generate an optimized noisy strategic network; and performing automatic driving control according to a driving strategy generated by the optimized noisy strategy network;

wherein performing parameter optimization on the system parameter of the noisy strategic network according to the noise parameter comprises:

performing parameter optimization on a system parameter of the noiseless strategic network according to the noisy strategy, and taking a system parameter of the optimized noiseless strategic network as an original parameter; and taking a sum of the original parameter and the noise parameter as an optimized system parameter of the noisy strategic network;

wherein the system parameter of the deep-reinforcement-learning automatic driving decision system comprises an initial strategy parameter with no noise, an initial strategy parameter with implicit noise, an initial network parameter and initial strategy parameter noise.

2. The method for automatic driving control according to claim 1, wherein before performing the automatic driving control according to the driving strategy generated by the optimized noisy strategy network, the method further comprises:

determining execution times of the parameter optimization;

determining whether the execution times reach a threshold number of training times;

performing the step of performing the automatic driving control according to the driving strategy generated by the optimized noisy strategy network, when the execution times reach the threshold number of training times; and performing the step of obtaining the vehicle traffic environmental state information when the execution times do not reach the threshold number of training times.

3. The method for automatic driving control according to claim 2, wherein the method further comprises:

performing the step of initializing the system parameter of the deep-reinforcement-learning automatic driving decision system when a notice of driving accident is received.

4. The method for automatic driving control according to claim 1, wherein the strategic network is a network constructed based on a deep-reinforcement-learning strategy parameter space.

5. The method for automatic driving control according to claim 4, wherein the deep-reinforcement-learning automatic driving decision system further comprises an evaluation network; and performing parameter optimization on the system parameter of the noisy strategic network according to the noise parameter comprises: update a parameter of the evaluation network, a parameter of the noiseless strategic network and a parameter of the strategic network with implicit noise.

6. A device for automatic driving control, comprising:
a memory configured for storing a computer program; and
a processor configured for implementing steps of the method for automatic driving control according to claim 1 when the computer program is executed.

7. The device for automatic driving control according to claim 6, wherein before performing the automatic driving control according to the driving strategy generated by the optimized noisy strategy network, the method further comprises:

determining execution times of the parameter optimization;

determining whether the execution times reach a threshold number of training times;

performing the step of performing the automatic driving control according to the driving strategy generated by the optimized noisy strategy network, when the execution times reach the threshold number of training times; and performing the step of obtaining the vehicle traffic environmental state information when the execution times do not reach the threshold number of training times.

8. The device for automatic driving control according to claim 7, wherein the method further comprises:

performing the step of initializing the system parameter of the deep-reinforcement-learning automatic driving decision system when a notice of driving accident is received.

9. The device for automatic driving control according to claim 6, wherein the noiseless strategic network refers to a strategic network with no noise, and the noisy strategic network refers to a strategic network with implicit noise, and the strategic network is a network constructed based on a deep-reinforcement-learning strategy parameter space.

10. The device for automatic driving control according to claim 9, wherein the deep-reinforcement-learning automatic driving decision system further comprises an evaluation network; and performing parameter optimization on the system parameter of the noisy strategic network according to the noise parameter comprises: update a parameter of the evaluation network, a parameter of the noiseless strategic network and a parameter of the strategic network with implicit noise.

11. A non-transitory readable storage medium, having a computer program stored thereon and the computer program, when executed by a processor, implementing steps of the method for automatic driving control according to claim 1.

12. The non-transitory readable storage medium according to claim 11, wherein before performing the automatic driving control according to the driving strategy generated by the optimized noisy strategy network, the method further comprises:

determining execution times of the parameter optimization;

determining whether the execution times reach a threshold number of training times;

performing the step of performing the automatic driving control according to the driving strategy generated by the optimized noisy strategy network, when the execution times reach the threshold number of training times; and performing the step of obtaining the vehicle traffic environmental state information when the execution times do not reach the threshold number of training times.

13. The non-transitory readable storage medium according to claim 12, wherein the method further comprises:
performing the step of initializing the system parameter of the deep-reinforcement-learning automatic driving decision system when a notice of driving accident is received.

14. The non-transitory readable storage medium according to claim 11, wherein the noiseless strategic network refers to a strategic network with no noise, and the noisy strategic network refers to a strategic network with implicit noise, and the strategic network is a network constructed based on a deep-reinforcement-learning strategy parameter space.

* * * * *